US007712658B2

(12) United States Patent  (10) Patent No.: US 7,712,658 B2
Gangi  (45) Date of Patent: *May 11, 2010

(54) WALLET CONSOLIDATOR AND RELATED METHODS OF PROCESSING A TRANSACTION USING A WALLET CONSOLIDATOR

(75) Inventor: Frank J. Gangi, Frisco, TX (US)

(73) Assignee: E-Micro Corporation, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,049

(22) Filed: Oct. 31, 2007

(65) Prior Publication Data

US 2008/0065535 A1  Mar. 13, 2008

Related U.S. Application Data

(63) Continuation of application No. 09/923,617, filed on Aug. 6, 2001, now Pat. No. 7,349,885, which is a continuation of application No. 09/618,407, filed on Jul. 18, 2000, now Pat. No. 6,293,462, which is a continuation of application No. 09/087,193, filed on May 29, 1998, now Pat. No. 6,131,811.

(51) Int. Cl.
*G06K 5/00* (2006.01)
*G06K 19/06* (2006.01)
*G06Q 40/00* (2006.01)
*G06F 7/08* (2006.01)

(52) U.S. Cl. ................ 235/380; 235/379; 235/381; 235/492; 705/41

(58) Field of Classification Search ............ 705/1, 705/41, 69, 70–74, 75; 235/370, 375, 379–383, 235/492

See application file for complete search history.

(56) References Cited

U.S. PATENT DOCUMENTS 3,845,277 A  10/1974  Voss et al.

(Continued)

FOREIGN PATENT DOCUMENTS

AU  732877 B2  10/1998

(Continued)

OTHER PUBLICATIONS

Internet Week, V2, n43; "Mastercard to Test IBM Digital Wallet; Software Will Open Market to Electronic Commerce"; Oct. 28, 1996; pp. 1-3.*

(Continued)

*Primary Examiner*—Ella Colbert
(74) *Attorney, Agent, or Firm*—Bracewell & Giuliani LLP

(57) ABSTRACT

A wallet consolidator to facilitate a transaction is provided. An embodiment of a wallet consolidator can include a housing, a data interface connected to the housing and positioned to effectuate communication between the wallet consolidator and one or more computing devices to thereby receive information associated with at least one card from one or more computing devices, and a memory positioned to store at least a portion of the information received by the data interface. The wallet consolidator can also include an input cluster connected to the housing to facilitate selection of at least a portion of the information by a user, a display screen to display a menu of functions to a user, and a controller positioned within the housing in communication with and to control each of the data interface, the memory, the input cluster, and the display screen.

20 Claims, 3 Drawing Sheets

U.S. PATENT DOCUMENTS

| | | |
|---|---|---|
| 4,016,405 A | 4/1977 | McCune et al. |
| 4,102,493 A | 7/1978 | Moreno |
| 4,214,230 A | 7/1980 | Fak et al. |
| 4,234,932 A | 11/1980 | Gorgens |
| 4,253,017 A | 2/1981 | Whitehead |
| 4,277,837 A * | 7/1981 | Stuckert ................ 235/380 |
| 4,314,352 A | 2/1982 | Fought |
| 4,390,968 A | 6/1983 | Hennessy et al. |
| 4,437,130 A | 3/1984 | Hennessy et al. |
| 4,438,326 A | 3/1984 | Uchida |
| 4,443,027 A | 4/1984 | McNeely et al. |
| 4,458,142 A | 7/1984 | Bernstein |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,701,601 A | 10/1987 | Francini et al. |
| 4,705,211 A | 11/1987 | Honda et al. |
| 4,707,594 A | 11/1987 | Roth |
| 4,742,351 A * | 5/1988 | Suzuki ................ 340/5.54 |
| 4,755,940 A | 7/1988 | Brachtl et al. |
| 4,772,782 A | 9/1988 | Nonat |
| 4,791,283 A | 12/1988 | Burkhardt |
| 4,837,422 A | 6/1989 | Dethloff et al. |
| 4,837,822 A | 6/1989 | Crosley et al. |
| 4,849,613 A | 7/1989 | Eisele |
| 4,868,376 A | 9/1989 | Lessin et al. |
| 4,918,631 A | 4/1990 | Hara et al. |
| 4,926,480 A | 5/1990 | Chaum |
| 4,928,001 A | 5/1990 | Masada |
| 4,959,788 A | 9/1990 | Nagata et al. |
| 4,960,982 A | 10/1990 | Takahira |
| 4,990,759 A | 2/1991 | Gloton et al. |
| 5,010,237 A * | 4/1991 | Kawana ................ 235/379 |
| 5,095,196 A | 3/1992 | Miyata |
| 5,130,519 A | 7/1992 | Bush et al. |
| 5,135,095 A | 8/1992 | Kocznar et al. |
| 5,157,247 A * | 10/1992 | Takahira ................ 235/492 |
| 5,168,520 A | 12/1992 | Weiss |
| 5,192,947 A | 3/1993 | Neustein |
| 5,220,501 A | 6/1993 | Lawlor et al. |
| 5,221,838 A | 6/1993 | Gutman et al. |
| 5,276,311 A | 1/1994 | Hennige |
| 5,317,636 A | 5/1994 | Vizcaino |
| 5,371,797 A | 12/1994 | Bocinsky, Jr. |
| 5,373,558 A | 12/1994 | Chaum |
| 5,375,037 A | 12/1994 | Le Roux |
| 5,412,192 A | 5/1995 | Hoss |
| 5,426,283 A | 6/1995 | Berthozat et al. |
| 5,434,398 A | 7/1995 | Goldberg |
| 5,434,919 A | 7/1995 | Chaum |
| 5,438,166 A | 8/1995 | Carey et al. |
| 5,438,186 A | 8/1995 | Nair et al. |
| 5,440,108 A | 8/1995 | Tran et al. |
| 5,444,616 A | 8/1995 | Nair et al. |
| 5,448,047 A | 9/1995 | Nair et al. |
| 5,455,407 A | 10/1995 | Rosen |
| 5,471,045 A | 11/1995 | Geronimi |
| 5,473,690 A | 12/1995 | Grimonprez et al. |
| 5,497,411 A | 3/1996 | Pellerin |
| 5,538,442 A | 7/1996 | Okada |
| 5,557,518 A | 9/1996 | Rosen |
| 5,568,121 A | 10/1996 | Lamensdorf |
| 5,578,808 A * | 11/1996 | Taylor ................ 235/380 |
| 5,585,787 A | 12/1996 | Wallerstein |
| 5,590,038 A * | 12/1996 | Pitroda ................ 705/41 |
| 5,590,197 A | 12/1996 | Chen et al. |
| 5,623,552 A | 4/1997 | Lane |
| 5,627,355 A | 5/1997 | Rahman et al. |
| 5,649,118 A | 7/1997 | Carlisle et al. |
| 5,655,008 A | 8/1997 | Futch et al. |
| 5,671,280 A | 9/1997 | Rosen |
| 5,689,247 A | 11/1997 | Welner |
| 5,745,555 A | 4/1998 | Mark |
| 5,748,737 A * | 5/1998 | Daggar ................ 705/41 |
| 5,754,652 A | 5/1998 | Wilfong |
| 5,754,653 A | 5/1998 | Canfield |
| 5,754,656 A | 5/1998 | Nishioka et al. |
| 5,761,309 A | 6/1998 | Ohashi et al. |
| 5,781,723 A * | 7/1998 | Yee et al. ................ 726/20 |
| 5,790,677 A | 8/1998 | Fox et al. |
| 5,818,030 A | 10/1998 | Reyes |
| 5,825,871 A | 10/1998 | Mark |
| 5,831,862 A | 11/1998 | Hetrick et al. |
| 5,832,457 A | 11/1998 | O'Brien et al. |
| 5,834,747 A | 11/1998 | Cooper |
| 5,834,756 A * | 11/1998 | Gutman et al. ................ 235/493 |
| 5,844,497 A | 12/1998 | Gray |
| 5,850,442 A | 12/1998 | Muftic |
| 5,883,810 A | 3/1999 | Franklin et al. |
| 5,884,271 A | 3/1999 | Pitroda |
| 5,895,903 A | 4/1999 | Abe et al. |
| 5,905,246 A | 5/1999 | Fajkowski |
| 5,913,203 A | 6/1999 | Wong et al. |
| 5,915,226 A | 6/1999 | Martineau |
| 5,917,168 A | 6/1999 | Nakamura et al. |
| 5,923,016 A | 7/1999 | Fredregill et al. |
| 5,936,226 A | 8/1999 | Aucsmith |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A | 9/1999 | Wong et al. |
| RE36,365 E | 11/1999 | Levine et al. |
| 5,991,412 A | 11/1999 | Wissenburgh et al. |
| 6,000,832 A | 12/1999 | Franklin et al. |
| 6,003,763 A | 12/1999 | Gallagher et al. |
| 6,012,634 A | 1/2000 | Brogan et al. |
| 6,012,636 A | 1/2000 | Smith |
| 6,014,634 A | 1/2000 | Scroggie et al. |
| 6,018,717 A | 1/2000 | Lee et al. |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,038,551 A * | 3/2000 | Barlow et al. ................ 705/41 |
| 6,039,244 A | 3/2000 | Finsterwald |
| 6,047,268 A | 4/2000 | Bartoli et al. |
| 6,050,493 A | 4/2000 | Fertig |
| 6,061,660 A | 5/2000 | Eggleston et al. |
| 6,068,184 A | 5/2000 | Barnett |
| 6,068,192 A | 5/2000 | McCabe et al. |
| 6,072,870 A | 6/2000 | Nguyen et al. |
| 6,075,861 A | 6/2000 | Miller, II |
| 6,078,888 A | 6/2000 | Johnson, Jr. |
| 6,078,902 A | 6/2000 | Schenkler |
| 6,089,451 A | 7/2000 | Krause |
| 6,098,053 A | 8/2000 | Slater |
| 6,101,477 A | 8/2000 | Hohle et al. |
| 6,111,953 A | 8/2000 | Walker et al. |
| 6,116,371 A | 9/2000 | Suyama et al. |
| 6,119,933 A | 9/2000 | Wong et al. |
| 6,122,625 A | 9/2000 | Rosen |
| 6,129,274 A | 10/2000 | Suzuki |
| 6,131,811 A | 10/2000 | Gangi |
| 6,132,799 A | 10/2000 | Corniglion et al. |
| 6,163,771 A | 12/2000 | Walker et al. |
| D436,620 S | 1/2001 | Webb et al. |
| 6,178,408 B1 | 1/2001 | Copple et al. |
| 6,188,309 B1 | 2/2001 | Levine |
| 6,189,787 B1 | 2/2001 | Dorf |
| 6,205,436 B1 | 3/2001 | Rosen |

| | | |
|---|---|---|
| 6,206,293 B1 | 3/2001 | Gutman et al. |
| RE37,122 E | 4/2001 | Levine et al. |
| 6,213,403 B1 | 4/2001 | Bates, III |
| 6,215,665 B1 | 4/2001 | Martin |
| 6,224,109 B1 | 5/2001 | Yang |
| 6,227,447 B1 | 5/2001 | Campisano |
| 6,230,977 B1 | 5/2001 | Johnson |
| 6,234,389 B1 * | 5/2001 | Valliani et al. ............... 235/380 |
| 6,257,486 B1 | 7/2001 | Teicher et al. |
| 6,292,786 B1 | 9/2001 | Deaton et al. |
| 6,293,462 B1 | 9/2001 | Gangi |
| 6,327,578 B1 | 12/2001 | Linehan |
| 6,332,134 B1 | 12/2001 | Foster |
| 6,339,766 B1 | 1/2002 | Gephart |
| 6,343,284 B1 | 1/2002 | Ishikawa et al. |
| 6,370,488 B1 | 4/2002 | Beaudoin et al. |
| 6,385,591 B1 | 5/2002 | Mankoff |
| 6,394,343 B1 | 5/2002 | Berg et al. |
| 6,403,029 B1 | 6/2002 | Gangi |
| 6,425,523 B1 | 7/2002 | Shem-Ur et al. |
| 6,456,984 B1 | 9/2002 | Demoff et al. |
| 6,470,233 B1 * | 10/2002 | Johnson, Jr. ............... 700/237 |
| 6,473,500 B1 | 10/2002 | Risafi et al. |
| 6,505,772 B1 | 1/2003 | Mollett et al. |
| 6,518,927 B2 | 2/2003 | Schremmer et al. |
| 6,549,912 B1 | 4/2003 | Chen |
| 6,607,127 B2 | 4/2003 | Wong |
| 7,047,414 B2 | 5/2003 | Wheeler et al. |
| 7,082,533 B2 | 5/2003 | Wheeler et al. |
| 7,184,980 B2 | 5/2003 | Allen-Rouman et al. |
| 6,574,730 B1 | 6/2003 | Bissell et al. |
| 6,581,827 B2 | 6/2003 | Welton |
| 6,592,044 B1 | 7/2003 | Wong et al. |
| 6,609,654 B1 | 8/2003 | Anderson et al. |
| 6,631,849 B2 | 10/2003 | Blossom |
| 6,636,833 B1 | 10/2003 | Flitcroft et al. |
| 6,685,088 B1 | 2/2004 | Royer et al. |
| 6,732,919 B2 | 5/2004 | Macklin et al. |
| 6,755,341 B1 | 6/2004 | Wong et al. |
| 6,755,344 B1 | 6/2004 | Mollett et al. |
| 6,761,309 B2 | 7/2004 | Stoutenburg et al. |
| 6,789,189 B2 | 9/2004 | Wheeler et al. |
| 6,805,288 B2 | 10/2004 | Routhenstein et al. |
| 6,814,282 B2 | 11/2004 | Seifert et al. |
| 6,820,199 B2 | 11/2004 | Wheeler et al. |
| 6,827,260 B2 | 12/2004 | Stoutenburg et al. |
| 6,834,270 B1 | 12/2004 | Pagani et al. |
| 6,847,953 B2 | 1/2005 | Kuo |
| 6,851,054 B2 | 2/2005 | Wheeler et al. |
| 6,857,566 B2 | 2/2005 | Wankmueller |
| 6,886,742 B2 | 5/2005 | Stoutenburg et al. |
| 6,892,302 B2 | 5/2005 | Wheeler et al. |
| 6,938,821 B2 | 6/2005 | Gangi |
| 6,915,279 B2 | 7/2005 | Hogan et al. |
| 6,915,430 B2 | 7/2005 | Wheeler et al. |
| 6,922,673 B2 | 7/2005 | Karas et al. |
| 6,935,559 B2 | 8/2005 | Mollett et al. |
| 6,938,156 B2 | 8/2005 | Wheeler et al. |
| 6,950,940 B2 | 9/2005 | Wheeler et al. |
| 6,952,773 B2 | 10/2005 | Wheeler et al. |
| 6,957,336 B2 | 10/2005 | Wheeler et al. |
| 6,959,381 B2 | 10/2005 | Wheeler et al. |
| 6,978,369 B2 | 12/2005 | Wheeler et al. |
| 6,981,154 B2 | 12/2005 | Wheeler et al. |
| 6,990,470 B2 | 1/2006 | Hogan et al. |
| 6,991,157 B2 | 1/2006 | Bishop et al. |
| 6,991,160 B2 | 1/2006 | Demere |
| 6,993,510 B2 | 1/2006 | Guy et al. |
| 7,003,479 B2 | 2/2006 | Cowell et al. |
| 7,003,493 B2 | 2/2006 | Weichert et al. |
| 7,010,691 B2 | 3/2006 | Wheeler et al. |
| 7,014,104 B2 | 3/2006 | MacFarlane et al. |
| 7,028,185 B2 | 4/2006 | Wheeler et al. |
| 7,032,112 B2 | 4/2006 | Wheeler et al. |
| 7,039,593 B2 | 5/2006 | Sager |
| 7,054,842 B2 | 5/2006 | James et al. |
| 7,058,611 B2 | 6/2006 | Kranzley et al. |
| 7,070,094 B2 | 7/2006 | Stoutenburg et al. |
| 7,083,081 B2 | 8/2006 | McGee et al. |
| 7,083,087 B1 | 8/2006 | Gangi |
| 7,086,584 B2 | 8/2006 | Stoutenburg et al. |
| 7,089,421 B2 | 8/2006 | Wheeler et al. |
| 7,092,916 B2 | 8/2006 | Diveley |
| 7,096,205 B2 | 8/2006 | Hansen et al. |
| 7,096,354 B2 | 8/2006 | Wheeler et al. |
| 7,104,440 B2 | 9/2006 | Hansen |
| 7,107,249 B2 | 9/2006 | Diveley et al. |
| 7,117,183 B2 | 10/2006 | Blair et al. |
| 7,158,955 B2 | 1/2007 | Diveley |
| 7,177,848 B2 | 2/2007 | Hogan et al. |
| 7,184,989 B2 | 2/2007 | Hansen et al. |
| 7,195,154 B2 | 3/2007 | Routhenstein |
| 7,225,154 B2 | 5/2007 | Hansen |
| 7,228,292 B2 | 6/2007 | Coyle |
| 7,257,228 B2 | 8/2007 | Wheeler et al. |
| 7,264,152 B2 | 9/2007 | Tsuei et al. |
| 7,266,533 B2 | 9/2007 | Karas et al. |
| 7,309,003 B2 | 12/2007 | Algiene et al. |
| 7,316,350 B2 | 1/2008 | Algiene |
| 7,319,977 B2 | 1/2008 | McGee et al. |
| 7,328,191 B2 | 2/2008 | McGee et al. |
| 7,357,312 B2 | 4/2008 | Gangi |
| 7,379,919 B2 | 5/2008 | Hogan et al. |
| 7,398,225 B2 | 7/2008 | Voltmer et al. |
| 7,398,252 B2 | 7/2008 | Neofytides et al. |
| 2001/0034720 A1 | 10/2001 | Armes |
| 2001/0045454 A1 | 11/2001 | Gangi |
| 2001/0047335 A1 | 11/2001 | Arndt et al. |
| 2001/0048023 A1 | 12/2001 | Fitzmaurice et al. |
| 2002/0007320 A1 | 1/2002 | Hogan et al. |
| 2002/0035548 A1 | 3/2002 | Hogan et al. |
| 2002/0083010 A1 | 6/2002 | Kim |
| 2002/0087462 A1 | 7/2002 | Seifert et al. |
| 2002/0104878 A1 | 8/2002 | Seifert et al. |
| 2002/0112160 A2 | 8/2002 | Wheeler et al. |
| 2002/0120584 A1 | 8/2002 | Hogan et al. |
| 2002/0138363 A1 | 9/2002 | Karas et al. |
| 2002/0138424 A1 | 9/2002 | Coyle |
| 2002/0143566 A1 | 10/2002 | Diveley |
| 2002/0143706 A1 | 10/2002 | Diveley |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0156683 A1 | 10/2002 | Stoutenberg et al. |
| 2002/0161702 A1 | 10/2002 | Milberger et al. |
| 2002/0166891 A1 | 11/2002 | Stoutenburg et al. |
| 2002/0169719 A1 | 11/2002 | Dively et al. |
| 2002/0174014 A1 | 11/2002 | Wittrup |
| 2002/0178025 A1 | 11/2002 | Hansen et al. |
| 2002/0198806 A1 | 12/2002 | Blagg et al. |
| 2003/0021242 A1 | 1/2003 | Drysdale et al. |
| 2003/0024979 A1 | 2/2003 | Hansen et al. |
| 2003/0036956 A1 | 2/2003 | Karas et al. |
| 2003/0051145 A1 | 3/2003 | Jackson et al. |
| 2003/0055780 A1 | 3/2003 | Hansen et al. |
| 2003/0065624 A1 | 4/2003 | James et al. |
| 2003/0069856 A1 | 4/2003 | Seifert et al. |
| 2003/0083987 A1 | 5/2003 | Stoutenberg et al. |
| 2003/0093367 A1 | 5/2003 | Allen-Rouman et al. |
| 2003/0095665 A1 | 5/2003 | Wheeler et al. |
| 2003/0097561 A1 | 5/2003 | Wheeler et al. |
| 2003/0097562 A1 | 5/2003 | Wheeler et al. |
| 2003/0097565 A1 | 5/2003 | Wheeler et al. |
| 2003/0097570 A1 | 5/2003 | Wheeler et al. |
| 2003/0097573 A1 | 5/2003 | Wheeler et al. |
| 2003/0097589 A1 | 5/2003 | Syvanne |

| | | |
|---|---|---|
| 2003/0101136 A1 | 5/2003 | Wheeler et al. |
| 2003/0101344 A1 | 5/2003 | Wheeler et al. |
| 2003/0110129 A1 | 6/2003 | Frazier et al. |
| 2003/0115463 A1 | 6/2003 | Wheeler et al. |
| 2003/0120498 A1 | 6/2003 | Villapudua |
| 2003/0120615 A1 | 6/2003 | Kuo |
| 2003/0126036 A1 | 7/2003 | Mascavage et al. |
| 2003/0126067 A1 | 7/2003 | Seifert et al. |
| 2003/0126075 A1 | 7/2003 | Mascavage et al. |
| 2003/0126083 A1 | 7/2003 | Seifert et al. |
| 2003/0126437 A1 | 7/2003 | Wheeler et al. |
| 2003/0126438 A1 | 7/2003 | Wheeler et al. |
| 2003/0126739 A1 | 7/2003 | Prater |
| 2003/0130907 A1 | 7/2003 | Karas et al. |
| 2003/0130940 A1 | 7/2003 | Hansen et al. |
| 2003/0130948 A1 | 7/2003 | Algiene et al. |
| 2003/0131234 A1 | 7/2003 | Wheeler et al. |
| 2003/0131235 A1 | 7/2003 | Wheeler et al. |
| 2003/0135438 A1 | 7/2003 | Blagg et al. |
| 2003/0135459 A1 | 7/2003 | Abelman et al. |
| 2003/0154164 A1 | 8/2003 | Mascavage, III et al. |
| 2003/0155416 A1 | 8/2003 | Macklin et al. |
| 2003/0158818 A1 | 8/2003 | George et al. |
| 2003/0171992 A1 | 9/2003 | Blagg et al. |
| 2003/0172039 A1 | 9/2003 | Guy et al. |
| 2003/0177067 A1 | 9/2003 | Cowell et al. |
| 2003/0182218 A1 | 9/2003 | Blagg |
| 2003/0187712 A1 | 10/2003 | Arthus et al. |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0229541 A1 | 12/2003 | Randall et al. |
| 2003/0229578 A1 | 12/2003 | Hansen et al. |
| 2003/0236747 A1 | 12/2003 | Sager |
| 2004/0006537 A1 | 1/2004 | Zelecoski et al. |
| 2004/0030647 A1 | 2/2004 | Hansen et al. |
| 2004/0039693 A1 | 2/2004 | Nauman et al. |
| 2004/0039702 A1 | 2/2004 | Blair et al. |
| 2004/0049452 A1 | 3/2004 | Blagg |
| 2004/0054625 A1 | 3/2004 | Kellogg et al. |
| 2004/0064405 A1 | 4/2004 | Weichert |
| 2004/0065726 A1 | 4/2004 | McGee et al. |
| 2004/0068437 A1 | 4/2004 | McGee et al. |
| 2004/0073511 A1 | 4/2004 | Beaumont et al. |
| 2004/0078327 A1 | 4/2004 | Frazier et al. |
| 2004/0083184 A1 | 4/2004 | Tsuei et al. |
| 2004/0088261 A1 | 5/2004 | Moore et al. |
| 2004/0112952 A1 | 6/2004 | Algiene et al. |
| 2004/0117299 A1 | 6/2004 | Algiene et al. |
| 2004/0117302 A1 | 6/2004 | Weichert et al. |
| 2004/0138947 A1 | 7/2004 | McGee et al. |
| 2004/0139008 A1 | 7/2004 | Mascavage |
| 2004/0148203 A1 | 7/2004 | Whitaker et al. |
| 2004/0148239 A1 | 7/2004 | Albee et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0159699 A1 | 8/2004 | Nelson et al. |
| 2004/0186773 A1 | 9/2004 | George et al. |
| 2004/0193551 A1 | 9/2004 | McGee et al. |
| 2004/0199461 A1 | 10/2004 | Hansen |
| 2004/0205023 A1 | 10/2004 | Hafer et al. |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211830 A1 | 10/2004 | Algiene |
| 2004/0211831 A1 | 10/2004 | Stoutenburg et al. |
| 2004/0215557 A1 | 10/2004 | Michelsen |
| 2004/0215574 A1 | 10/2004 | Michelsen et al. |
| 2004/0230527 A1 | 11/2004 | Hansen et al. |
| 2004/0030657 A1 | 12/2004 | Holm-Blagg et al. |
| 2004/0254894 A1 | 12/2004 | Tsuei et al. |
| 2004/0260653 A1 | 12/2004 | Tsuei et al. |
| 2005/0005117 A1 | 1/2005 | Wheeler et al. |
| 2005/0005118 A1 | 1/2005 | Wheeler et al. |
| 2005/0005123 A1 | 1/2005 | Wheeler et al. |
| 2005/0005124 A1 | 1/2005 | Wheeler et al. |
| 2005/0010505 A1 | 1/2005 | Darrell |
| 2005/0015280 A1 | 1/2005 | Gabel et al. |
| 2005/0017067 A1 | 1/2005 | Seifert et al. |
| 2005/0044373 A1 | 2/2005 | Wheeler et al. |
| 2005/0075974 A1 | 4/2005 | Turgeon |
| 2005/0080691 A1 | 4/2005 | Holm-Blagg |
| 2005/0080730 A1 | 4/2005 | Sorrentino |
| 2005/0091116 A1 | 4/2005 | Monk |
| 2005/0091153 A1 | 4/2005 | Monk |
| 2005/0107152 A1 | 5/2005 | McGee et al. |
| 2005/0108127 A1 | 5/2005 | Brown et al. |
| 2005/0108130 A1 | 5/2005 | Monk |
| 2005/0114217 A1 | 5/2005 | Monk |
| 2005/0116027 A1 | 6/2005 | Algiene et al. |
| 2005/0119968 A1 | 6/2005 | Michelsen et al. |
| 2005/0119969 A1 | 6/2005 | Michelsen et al. |
| 2005/0137986 A1 | 6/2005 | Kean |
| 2005/0167481 A1 | 8/2005 | Hansen et al. |
| 2005/0177496 A1 | 8/2005 | Blagg et al. |
| 2005/0185774 A1 | 8/2005 | Grear et al. |
| 2005/0185780 A1 | 8/2005 | Grear et al. |
| 2005/0187782 A1 | 8/2005 | Grear et al. |
| 2005/0187830 A1 | 8/2005 | Grear et al. |
| 2005/0187841 A1 | 8/2005 | Grear et al. |
| 2005/0187864 A1 | 8/2005 | Grear et al. |
| 2005/0187865 A1 | 8/2005 | Grear et al. |
| 2005/0187870 A1 | 8/2005 | Grear et al. |
| 2005/0187938 A1 | 8/2005 | Grear et al. |
| 2005/0192874 A1 | 9/2005 | Grear et al. |
| 2005/0192895 A1 | 9/2005 | Rogers et al. |
| 2005/0192897 A1 | 9/2005 | Rogers et al. |
| 2005/0209961 A1 | 9/2005 | Michelsen et al. |
| 2005/0211763 A1 | 9/2005 | Sgambati et al. |
| 2005/0234817 A1 | 10/2005 | VanFleet et al. |
| 2005/0234822 A1 | 10/2005 | VanFleet et al. |
| 2005/0261968 A1 | 11/2005 | Randall et al. |
| 2005/0263587 A1 | 12/2005 | Martinez |
| 2005/0267840 A1 | 12/2005 | Holm-Blagg et al. |
| 2005/0288964 A1 | 12/2005 | Lutzen et al. |
| 2006/0005192 A1 | 1/2006 | Prendergast et al. |
| 2006/0016879 A1 | 1/2006 | Kean |
| 2006/0028319 A1 | 2/2006 | Kean et al. |
| 2006/0036496 A1 | 2/2006 | Cowell et al. |
| 2006/0036543 A1 | 2/2006 | Blagg et al. |
| 2006/0059040 A1 | 3/2006 | Eldred et al. |

FOREIGN PATENT DOCUMENTS

| | | |
|---|---|---|
| AU | 732877 | 5/2001 |
| DE | 100 50 882 A1 | 5/2002 |
| DE | 10050882 | 5/2002 |
| EP | 0661675 A2 | 5/1995 |
| EP | 0656600 A2 | 6/1995 |
| EP | 0656600 A2 | 6/1995 |
| EP | 0661675 | 7/1995 |
| EP | 0722241 | 7/1996 |
| EP | 0722241 A2 | 12/1996 |
| EP | 1017030 | 7/2000 |
| EP | 1017030 A2 | 7/2000 |
| EP | 1028401 | 8/2000 |
| EP | 1028401 A2 | 8/2000 |
| JP | 55143679 | 11/1980 |
| JP | 55143679 A | 11/1980 |
| JP | 61253580 | 11/1986 |
| JP | 02148374 | 11/1988 |
| JP | 02148374 | 6/1990 |
| JP | 05040864 | 2/1993 |
| JP | 05040884 | 6/1993 |

| | | |
|---|---|---|
| JP | 2004102784 | 4/2004 |
| WO | WO92/16913 | 10/1992 |
| WO | WO 92/16913 A1 | 10/1992 |
| WO | 98/10363 A1 | 3/1998 |
| WO | 98/12675 A2 | 3/1998 |
| WO | WO98/10363 | 3/1998 |
| WO | WO98/12675 | 3/1998 |
| WO | WO99/05633 | 2/1999 |
| WO | WO 99/05633 A1 | 2/1999 |
| WO | WO99/38129 | 7/1999 |
| WO | WO 99/38129 A1 | 7/1999 |
| WO | WO99/49424 | 9/1999 |
| WO | WO 99/49424 A1 | 9/1999 |
| WO | WO99/57675 | 11/1999 |
| WO | WO 99/57675 A1 | 11/1999 |
| WO | WO00/25262 | 5/2000 |
| WO | WO 00/25262 A1 | 5/2000 |
| WO | WO00/30048 | 5/2000 |
| WO | WO 00/30048 A1 | 5/2000 |
| WO | WO00/33497 | 6/2000 |
| WO | WO 00/33497 A2 | 6/2000 |
| WO | WO00/49586 | 8/2000 |
| WO | WO 00/49586 A1 | 8/2000 |
| WO | WO 00/52900 A1 | 9/2000 |
| WO | WO 00/54208 A2 | 9/2000 |
| WO | 01/29789 A1 | 4/2001 |
| WO | WO01/29789 | 4/2001 |
| WO | WO 01/46902 A1 | 6/2001 |
| WO | WO01/48902 | 7/2001 |
| WO | WO01/50428 | 7/2001 |
| WO | WO 01/50429 A | 7/2001 |
| WO | WO01/54082 | 7/2001 |
| WO | WO 01/54082 A2 | 7/2001 |
| WO | 01/61920 A1 | 8/2001 |
| WO | WO01/61920 | 8/2001 |
| WO | WO01/69556 | 9/2001 |
| WO | WO 01/69556 A2 | 9/2001 |
| WO | WO01/71675 | 9/2001 |
| WO | WO 01/71675 A1 | 9/2001 |
| WO | WO01/78024 | 10/2001 |
| WO | WO 01/78024 A2 | 10/2001 |
| WO | 01/88659 A2 | 11/2001 |
| WO | WO01/88695 | 11/2001 |
| WO | WO2005005287 | 1/2005 |
| WO | 2005/052871 A1 | 6/2005 |
| WO | WO 2005/052871 A1 | 6/2005 |

OTHER PUBLICATIONS

Curtis, Walt and Schnaidt, Patricia; " The electronic Wallet. (secure ID cards and digital cash)"; Network Computing, v5, n. 14; Nov. 15, 1994; p. 1.*
Hwang, Diana;"Vendors step up to challenge posed by smart card technology"; Computer Reseller News, n. 63; Oct. 16, 1995; pp. 1-3.*
File history of Gangi, US Patent 6,938,821, (U.S. Appl. No. 10/052,405) including arguments from the Examiner and arguments in support of patentability.
File History of Gangi, US Patent 7,083,087 (U.S. Appl. No. 11/130,765), including arguments from the Examiner and arguments in support of patentability.
File History of Gangi, U.S. Appl. No. 11/929,592.
Partial File History of Gangi U.S. Appl. No. 10/253,012, abandoned.
Partial File History of Gangi, US Patent 6,131,811 (U.S. Appl. No. 10/052,405) including arguments from the Examiner and arguments in support of patentability.
Partial File History of Gangi, US Patent 6,293,462 (U.S. Appl. No. 09/818,407) including arguments from the Examiner and arguments in support of patentabilitys.
Partial File History of Gangi, US Patent 6,402,029 (U.S. Appl. No. 09/664,205) including arguments from the Examiner and arguments in support of patentability.
File History of Gangi U.S. Appl. No. 11/923,049.
File History of Gangi U.S. Appl. No. 11/931,479.
Partial File History of Gangi, U.S. Appl. No. 09/923,617 including arguments from the Examiner and arguments in support of patentability.
Towitoko Electronics, "Product Overview Smartcard Terminals & Systems," Feb. 1998.
Dr. Klaus Vedder and Dr. Franz Weikmann, Giesecke & Derivant, "Smart Cards-Requirements, Properties and Applications," 1998.
"ActivCard," ActivCard, Inc., 1998.
OKI Advanced Products, Oki America, Inc., "Value-Cheker.TM. CP," 1998.
Logis Chipcards Products, "Logismart Chipcard Readers—Worth Your Attention," 1998.
Selec Oy, "Setpurse. TM," 1998.
NURI Information & Communications Inc., "NURI Smart Card Solutions," 1998.
Visa US s., "Visa Smart".
Vivowallett, found at www.vivotech.com.
Lindenmayer, Article, American Bunker, titled First Date, Grocer Tie ACH Payments to Loyalty Cards, Feb. 8, 2006.
Towitoko Electronics GmbH, "Product Overview Smartcard Terminals & Systems," Feb. 1998 (31 pages) Taufkirchen.
K Vedder, et al., Smart Cards—Requirements, Properties and Applications, Gieseck & Devrient GmbH, 1998 (22 pages) Germany.
ActivCard, ActivCard, Inc., 1998 (12 pages).
OKI Advanced Products, OKI America, Inc., "Value-Checker.TM. CP," 1998 (3 pages).
Logis Chipcard Products,"Logismart Chipcard Readers—Worth Your Attention," 1998 (10 pages).
Setec Oy, "Setpurse.TM.," 1998 (38 pages) Finland.
NURI Information & Communication Inc., "To Ensure Your Information Services NURI Smart Card Solutions," 1998 (21 pages) Korea.
Visa U.S.S., "VisaSmart" (9 pages).
ViVOwallet, found at www.vivotech.com (15 pages).
Isabelle Lindenmayer, American Banker The Financial Services Daily, titled First Data, Grocer Tie ACH Payments to Loyalty Cards, Feb. 8, 2006 (5 pages).
Abstract for Japanese Patent Publication No. 2004-102784, Patent Abstracts of Japan (2 pages).
Abstract for Japanese Patent Publication No. 61-253580, Patent Abstracts of Japan (1 page).
Abstract for German Patent Publication No. 10050882, esp@cenet (1 page).
Abstract for Japanese Patent Publication No. 55-143679, Patent Abstracts of Japan (2 pages).
Abstract for Japanese Patent Publication No. 02-148374, Patent Abstracts of Japan (2 pages).
Abstract for Japanese Patent Publication No. 05-040864, Patent Abstracts of Japan (2 pages).
Abstract for WO0030048, esp@cenet (1 page).
Abstract for WO0171675, esp@cenet (1 page).
R. Zapata, "Visa Hit with Suit Over No-Contact Credit Cards", IPLaw360,Portfolio Media Inc., Oct. 4, 2007 (3 pages).
EMV '96 Integrated Circuit Card Terminal Specification for Payment Systems, Version 3.1.1, May 31, 1998 (116 pages).
ISO/IEC JTC 1/SC 27, IT—Security Techniques, May 10, 1999 (4 pages).
File History of Gangi, U.S. Patent 6,938,821, (U.S. Appl. No. 10/052,405) including arguments from the Examiner and arguments in support of patentability.
File History of Gangi, U.S. Patent 7,083,087 (U.S. Appl. No. 11/130,765), including arguments from the Examiner and arguments in support of patentability.
Partial File History of Gangi U.S. Appl. No. 10/235,012, abandoned.
Partial File History of Gangi, U.S. Patent 6,131,811 (U.S. Appl. No. 09/087,193), including arguments from the Examiner and arguments in support of patentability.
Partial File History of Gangi U.S. Patent 6,293,462 (U.S. Appl. No. 09/818,407), including arguments from the Examiner and arguments in support of patentability.

Partial File History of Gangi U.S. Patent 6,402,029 (U.S. Appl. No. 09/664,205), including arguments from the Examiner and arguments in support of patentability.

File History of Gangi U.S. Appl. No. 11/932,049.

File History of Gangi U.S. Appl. No. 11/931,479.

File History of Gangi U.S. Appl. No. 09/923,617, including arguments from the Examiner and arguments in support of patentability—part 1.

File History of Gangi U.S. Appl. No. 09/923,617, including arguments from the Examiner and arguments in support of patentability—part 2.

Office Action from co-pending U.S. Appl. No. 11/929,592, dated May 19, 2008 (5 pages).

Response to Restriction Requirement with Extension of Time from co-pending U.S. Appl. No. 11/929,592, submitted on May 23, 2008 (9 pages).

Office Action, from co-pending U.S. Appl. No. 11/929,592, dated Jun. 30, 2008 (23 pages).

Terminal Disclaimer and Statement Under 37 CFR 3.73(b) and Response to Office Action, from co-pending U.S. Appl. No. 11/929,592, submitted on Sep. 30, 2008 (32 pages).

Supplemental Amendment, Exhibit A (Substitute Specification), Exhibit B (Substitute Specification: Track Changes Copy), from co-pending U.S. Appl. No. 11/929,592, submitted on Dec. 4, 2008 (89 pages).

Notice of Allowance, from co-pending U.S. Appl. No. 11/929,592, dated Jan. 22, 2009 (34 pages).

Comments on Statement of Reasons for Allowance and Part B—Fee(s) Transmittal, from co-pending U.S. Appl. No. 11/929,592, submitted Jan. 23, 2009 (2 pages).

Declaration Under 37 C.F.R. 1.131 by Frank Gangi With 32 Exhibits.

"American Express India expands Membership Rewards program", M2 Presswire, Mar. 2000, http://findarticles.com/p/articles/mi_hb5243/is_200003/ai_n20070910/, 1 page.

"Continental Airlines: Continental Airlines in introduces interactive customer loyalty program", M2 Presswire, Dec. 1999, 1 page.

"AmEx Rewards Beefed-Up", Oct. 14, 1999, CardTrak Online, http//www.cardweb.com/cardtrak/news/1999/october/4a.html, 2 pages.

"Midway Airlines joins American Express membership rewards programme", Airlien Industry Information, Mar. 3, 2000, http://www.allbusiness.com/operations/shipping-aair-freight/448154-1.html, 3 pages.

Rowley, Jennifer, "Loyalty Kiosks: making loyalty cards work", British Food Journal, 2000, vol. 102, Issue 5/6, p. 390-398.

"The History of Frequent Flyer Programs" From SmarterTravel, http://wiki.smartertravel.com/index.php/The_History_of_Frequent_Flyer_Programs, 2 pages.

Office Action for U.S. Appl. No. 11/931,479 dated Apr. 15, 2009.

R.Zapata, article, titled Visa Hit with Suit Over No-Contact Credit Cards, Portfolio Media, Oct. 4, 2007.

EMV '96 Integrated Circuit Card Application Specification for Payment Systems, Version 3.1.1 (May 31, 1998 ).

ISO/IEC JTC 1/SC 27 Information Technology—Security Techniques (May 10, 1998).

* cited by examiner

WALLET CONSOLIDATOR AND RELATED METHODS OF PROCESSING A TRANSACTION USING A WALLET CONSOLIDATOR

RELATED APPLICATIONS

This application is a continuation of and claims priority to and the benefit of U.S. patent application Ser. No. 09/923,617, filed Aug. 6, 2001, titled "Wallet Consolidator and Related Methods of Processing a Transaction Using a Wallet Consolidator," now U.S. Pat. No. 7,349,885, which is a continuation of U.S. patent application Ser. No. 09/618,407, filed Jul. 18, 2000, titled "Wallet Consolidator," now U.S. Pat. No. 6,293,462, which is a continuation of U.S. patent application Ser. No. 09/087,193, filed May 29, 1998, titled "Wallet Consolidator," now U.S. Pat. No. 6,131,811, each incorporated herein by reference in their entireties.

BACKGROUND OF THE INVENTION

1. Field of the Invention

The present invention pertains in general to the use of electronic smart cards for the storage of information pertaining to electronic commerce and consumer identification, and in particular, but not by way of limitation, to an apparatus for the warehousing and retrieval of information pertaining to credit cards, debit cards, identification cards, and other selected data.

2. Description of Related Art

In today's electronic commerce there has been a proliferation in the use of various types of credit, debit, identification, and other types of authorization cards. For example, an average individual is likely to carry a driver's license, several credit and debit cards, an identification card for access to a health club, an identification card to gain access to a place of employment, and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allows for easy and efficient electronic commerce, the number of such cards quickly becomes cumbersome and many individuals find carrying the large number of cards inconvenient.

Attempts have been made to use a single smart card to hold the various information contained on several cards. These attempts, however, involve the downloading of information from the smart card provider and do not allow a smart card user to control the contents of the device by adding additional information from newly issued cards or removing information from discontinued cards.

It would be advantageous, therefore, to devise an apparatus for consolidating the various cards, and other types of information, which individuals typically carry in a wallet or purse. It would further be advantageous if such an apparatus stored the information in a central location and facilitated the use of a single multi-purpose card. It would still further be advantageous if such an apparatus allowed the user of the apparatus the ability to control the stored information.

SUMMARY OF THE INVENTION

In view of the foregoing, embodiments of the present invention advantageously provide a device or apparatus, also known as a wallet consolidator, capable of warehousing digitized information stored on various types of credit, debit, identification, and other types of authorization cards, including identification information, some or all of which to be delivered to various computing devices and possibly a portion to a device operator located with the computing device. According to an embodiment of the present invention, a wallet consolidator to facilitate a transaction can include, for example, a housing, a data interface connected to the housing and positioned to effectuate communication between the wallet consolidator and one or more computing devices, and a memory positioned in the housing and positioned to store at least a portion of the information received by the data interface. The data interface, for example, can be positioned to receive information associated with at least one card from one or more computing devices so that at least a portion of the information received by the data interface enables a transaction. The at least one card can be, for example, a credit card, a debit card, an identification card, or an electronic coupon. The data interface, for example, can include a magnetic stripe reader/writer for reading and writing magnetic stripes, a bar code scanner for scanning bar codes, a serial data port, a parallel data port, or any other data communication technique.

An embodiment of the wallet consolidator can also include an input cluster connected to the housing to facilitate selection of at least a portion of the information by a user, and a controller positioned within the housing in communication with each of the data interface, the memory, the input cluster, and the display screen. The display screen, for example, can be configured to display a menu of functions to a user. The menu of functions, can, for instance, include one or more of: adding card information, deleting card information, duplicating information, transferring information, moving cash, and accessing information. The information received by the data interface, can include, for example, identification information. Moreover, the controller, according to an embodiment of the wallet consolidator can be positioned to control input of the information into the memory of the wallet consolidator through the data interface, display of the menu of functions to a user through the display screen, retrieval of the at least a portion of the information from the memory, and display of at least a portion of the information stored in the memory on the display screen when a user selects the at least a portion of the information using the input cluster and positions the display screen of the wallet consolidator to enable a transaction responsive to the at least a portion of the information stored in the memory being displayed on the display screen. Additionally, according to an embodiment of the present invention, the wallet consolidator can further include a radio frequency wireless communication interface.

Additionally, according to an embodiment of the present invention, the information displayed on the display screen can comprise information from the memory being displayed as controlled by the controller. The information can be, for example, signatures, portraits, bar codes which can be scanned by a bar code scanner, and images of one or more cards. Additionally, the input cluster can be adapted to receive an input of a passcode from a user to gain access to the wallet consolidator so that the controller displays the menu of functions after the user gains access to the wallet consolidator by entering the passcode through the input cluster. Additionally, the information received by data interface can include can include information associated with one or more of: driver's licenses, food stamps, credit cards, debit cards, identification cards, electronic coupons, health club cards, parking cards, entry access cards, and medical records. Moreover, the wallet consolidator can further include a touch sensitive display associated with the display screen, associated with the housing, and positioned adjacent to the input cluster.

According to another embodiment of the present invention, the memory can be configured to have sufficient memory to store a digitized image. The digitized image can include, for instance, a digitized image of a signature, a portrait, the at least one card, and a bar code. The controller can, for example, be configured to operably store the digitized image in the memory of the wallet consolidator and to display the digitized image on the display screen of the wallet consolidator. Furthermore, the digitized image displayed on the display screen can be adapted to be used at a point-of-sale terminal. The controller, for example can operably store a digitized image of a bar code in the memory of the wallet consolidator. Likewise, the controller can be adapted to display the digitized image of a bar code on the display screen so that the displayed digitized image of a bar code can be scannable by a bar code scanner. In another embodiment of the present invention, the information stored in the memory of the wallet consolidator can include at least one bar code and the controller can be configured to operably display the bar code on the display screen to thereby define a displayed bar code image. The displayed bar code image, for example, can be adapted to be scannable by a bar code scanner.

According to another exemplary embodiment of the present invention, a wallet consolidator to facilitate a transaction can include a housing and a radio frequency transceiver connected to the housing and positioned to effectuate communication between the wallet consolidator and one or more computing devices to thereby receive information associated with at least one card from one or more computing devices so that at least a portion of the information received by the radio frequency transceiver enables a transaction. The wallet consolidator can also include, for example, a memory positioned in the housing and positioned to store at least a portion of the information received by the radio frequency transceiver, an input cluster connected to the housing to facilitate selection of at least a portion of the information received by the radio frequency transceiver, a display screen to display a menu of functions to a user, and a controller positioned within the housing in communication with each of the radio frequency transceiver, the memory, the input cluster, and the display screen. Additionally, for example, the controller can be positioned to control input of the information into the memory of the wallet consolidator through the radio frequency transceiver, display of the menu of functions to a user through the display screen, retrieval of the at least a portion of the information from the memory, and display of at least a portion of the information stored in the memory on the display screen when a user selects the at least a portion of the information using the input cluster and positions the display screen of the wallet consolidator to enable a transaction responsive to the at least a portion of the information stored in the memory being displayed on the display screen.

According to another embodiment of the wallet consolidator, the wallet consolidator can also include, for example, one or more input devices. The one or more input devices can include, but are not limited to, one or more of the following: a magnetic stripe card reader, a bar code reader, a keypad, a touch screen, a smart card reader, a kiosk, a memory card, a telephony interface, a wireless interface, a wireline communication interface, a wireless communication interface, an infrared (IR) interface, and a radio frequency (RF) interface. The memory can include, but is not limited to, one or more of the following: semiconductor memory, a smart card (contact, contactless, or hybrid), a memory card (portable flash memory), random access memory (RAM), magnetic memory, a hard disk, a magnetic tape, an optical memory device, and an optical disc. Also according to an embodiment of the present invention, the wallet consolidator can include, for example, a communication interface. The communication interface can include, but is not limited to, one or more of the following: a data interface, a telephony interface, a wireless interface, a wireline communication interface, a wireless communication interface, a radio frequency (RF) interface, an infrared (IR) interface, and a display configured for displaying scannable bar codes.

To store information in the wallet consolidator, for example, or alternatively in a smart card interfaced to the wallet consolidator, information can be read from magnetic stripes on various types of cards such as, but not limited to, credit, debit, and identification cards. A bar code scanner allows a bar code to be scanned from a card and stored in the memory. Additionally, images of the cards including, but not limited to, signatures and portraits can be downloaded, and with sufficient memory, stored for future use. A user can retrieve information using the one or more input devices for use in, for example, a point-of-sale transaction. The stored images can be retrieved and displayed on a display screen, including a bar code, which can be scanned by a bar code scanner.

According to another embodiment of a wallet consolidator, the wallet consolidator can include one or more input devices positioned to receive information stored on at least one card, a memory connected to the one or more input devices to store the information received by the input device, and a communication interface connected to the memory and positioned to transmit at least a portion of the information stored in the memory to a point-of-sale terminal located at a point-of-sale. The point-of-sale terminal can be positioned to process a transaction responsive to the at least a portion of the information. The information can include, for example, account identification information pertaining to at least one of the following: one or more credit cards, one or more debit cards, one or more identification cards, one or more electronic coupons, one or more medical records, one or more health club membership accounts, or one or more food stamp accounts. Accordingly, the at least one card can include one or more credit cards, one or more debit cards, one or more identification cards, one or more electronic coupons, one or more medical record cards, one or more health club identification access cards, one or more employment identification access cards, one or more parking garage access cards, or one or more food stamp identification cards. The information can also include driver's license data taken from, for example, a driver's license card. Further, the information can include a digitized image of the at least one card, to thereby provide further functionality. Advantageously, the communication interface can include, for example, a wireless interface, a wireless communication interface, or a radio frequency (RF) wireless communication interface, to thereby enhance personal mobility.

According to another embodiment of the present invention, a wallet consolidator includes a controller positioned to control operation of the wallet consolidator, one or more input devices in communication with the controller and positioned to receive a copy of identification information stored on at least one card, a memory in communication with the controller and positioned to store the identification information received by the one or more input devices, and a communication interface in communication with the controller and positioned to transmit at least a portion of the identification information stored in the memory to a point-of-sale terminal located at a point-of-sale. The point-of-sale terminal can be positioned to process a point-of-sale transaction responsive to the at least a portion of the identification information. According to an embodiment of the wallet consolidator, the information can include identification information contained on the at least one card, and the communication interface can be wireless and can include, for example, a wireless interface, a wireless communication interface, or a radio frequency (RF) wireless communication interface, to thereby enhance personal mobility.

According to another embodiment of a wallet consolidator, the wallet consolidator can include one or more input devices positioned to receive information stored on at least one card, a memory connected to the input device to store the information received by the input device, and a wireless communication interface connected to the memory and positioned to transmit at least a portion of the information stored in the memory to a point-of-sale terminal located at a point-of-sale. The point-of-sale terminal can be positioned to process a transaction responsive to the at least a portion of the information.

According to another embodiment of a wallet consolidator, the wallet consolidator can include an one or more input devices positioned to receive information stored on at least one card, a memory connected to the one or more input devices to store the information received by the one or more input devices, and a communication interface connected to the memory and positioned to effectuate communication of at least a portion of the information stored in the memory to a point-of-sale terminal located at a point-of-sale when the point-of-sale terminal is positioned to receive the at least a portion of the information from the wallet consolidator for use in a point-of-sale transaction. The communication interface can include, for example, a data interface, a telephone interface, an infrared transceiver, a wireless communication interface, or a radio frequency (RF) wireless communication interface.

According to another embodiment of a wallet consolidator, the wallet consolidator can include a controller positioned to control operation of the wallet consolidator, one or more input devices in communication with the controller and positioned to receive information contained on at least one card, a memory in communication with the controller and positioned to store the information received by the one or more input devices, and a wireless communication interface in communication with the controller and positioned to interface with a point-of-sale terminal located at a point-of-sale to provide at least a portion of the information stored in the memory to the point-of-sale terminal. The point-of-sale terminal can be positioned to enable a transaction responsive to receiving the at least a portion of the information.

According to another embodiment of a wallet consolidator, the wallet consolidator can include a controller positioned to control operation of the wallet consolidator, one or more input devices in communication with the controller and positioned to receive information contained on at least one card, a memory in communication with the controller and positioned to store the information received by the input device, and a wireless communication interface in communication with the controller. The wireless communication interface is adapted to be positioned to interface or to effectuate communication with a point-of-sale terminal located at a point-of-sale to provide at least a portion of the information stored in the memory to the point-of-sale terminal when the wallet consolidator is positioned adjacent the point-of-sale terminal to thereby enable a transaction responsive to receiving the at least a portion of the information.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
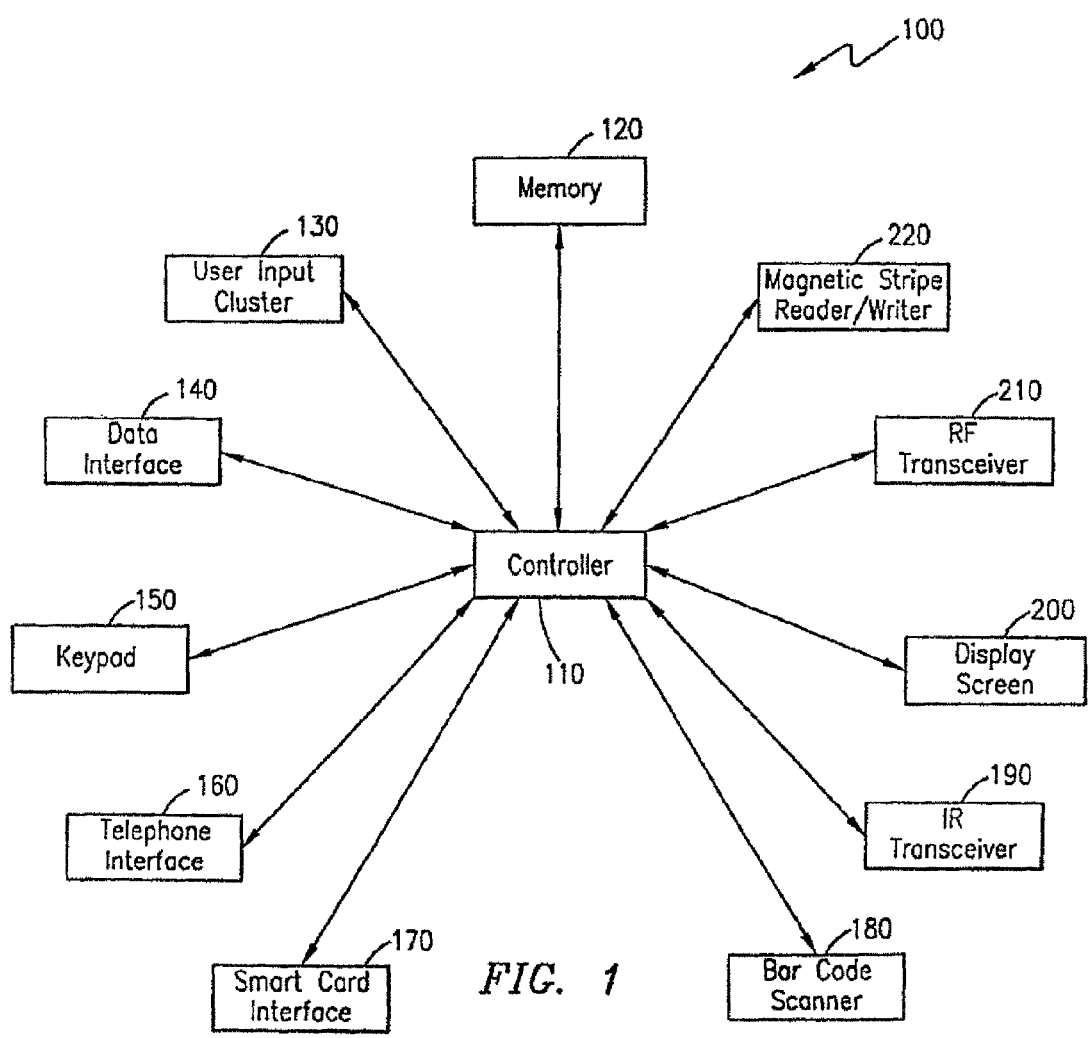
FIG. 1 is a functional block diagram of the wallet consolidator.

Referring now to FIG. 1, there is illustrated a functional block diagram of a wallet consolidator shown generally at 100. The functional components of the wallet consolidator 100 can include a controller 110, a memory device 120, a user input cluster 130, a data interface 140, a keypad 150, a telephone interface 160, a smart card interface 170, a bar code scanner 180, an infrared (IR) transceiver 190, a display screen 200, a radio frequency (RF) transceiver 210, and a magnetic stripe reader/writer 220.

The controller 110 controls the overall operation of the wallet consolidator 100 including the coordination of the various functional blocks. The magnetic stripe reader/writer 220 is used to read and write information from and to magnetic stripes used on credit cards, debit cards, and identification cards among others. Information read from the magnetic stripes by the magnetic stripe reader/writer 220 can be stored in the memory device 120 of the wallet consolidator 100. In an alternative embodiment, the information can be stored in a memory device located within a smart card which is commonly known in the industry. In situations where the information from the magnetic stripe is stored in the memory device of the smart card, the information can be written into the memory of the smart card using the smart card interface 170. The smart card interface 170 can effectuate reading and writing from and to the smart card.

A keypad 150 can be used as a user input device for inputting information or indicating selections and actions to the wallet consolidator 100. In an embodiment of the present invention, the keypad 150 is a numeric keypad, however; in an alternative embodiment the keypad 150 is an alphanumeric keypad. The user input cluster 130 provides an additional user input device for communicating selections and actions to the wallet consolidator 100. While it is understood that the user input cluster 130 can have any number of input buttons, a preferred configuration includes an up and a down button for moving through options provided to the user on the display screen 200, a delete button for removing items from the display screen, and an activate button for making a selection or enabling an action by the wallet consolidator 100.

The bar code scanner 180 allows a user to scan a bar code on the face of identification, credit, debit, and other types of cards and to store the bar code in the memory device 120 of the wallet consolidator, or alternatively, in the memory device of the smart card. In either event, the user can select the bar code for display on the display screen 200 such that the bar code, as displayed on the display screen 200, is readable by a bar code scanner.

In addition to displaying items stored in the memory device 120 of the wallet consolidator 100, or alternatively the memory device of the smart card, the display screen 200 can be used for programming, or otherwise controlling, the operation of the wallet consolidator 100. For example, the display screen 200, in conjunction with the keypad 150 or the user input cluster 130, can be used by the user to input a passcode to gain access to the wallet consolidator 100. In an alternative embodiment, the keypad 150 can be effectuated using a touch sensitive display screen 200.

After gaining access to the wallet consolidator 100, the controller 110 can display a menu of functions on the display screen 200 and the user can make a selection by either using the user input cluster 130 to scroll through and select an option or by directly selecting an option using the keypad 150. The types of options can include, but are not limited to, selecting a card to add or delete, duplicating information, transferring data, moving cash, or accessing various types of information such as electronic coupons, identification information, or medical records among others. Based on the selected option, the wallet consolidator 100, via the display screen 200, can traverse an action tree which instructs the user on the use of the wallet consolidator 100.

The data interface 140 and telephone interface 160 can effectuate communication between the wallet consolidator 100 and various computing devices such as, but not limited to, point-of-sale terminals, dumb terminals, and databases. The data interface 140 can use a serial data port, a parallel data port, or any other data communication technique. In a similar fashion, the telephone interface 160 can allow communication via a wireline or wireless telecommunication network. Furthermore, the infrared transceiver 190 and the radio frequency transceiver 210 can effectuate wireless communication between the wallet consolidator 100 and various computing devices such as, but not limited to, point-of-sale terminals, dumb terminals, and databases, which are equipped with a similar infrared transceiver or radio frequency transceiver.

The wallet consolidator 100, according to an embodiment of the present invention, can allow an individual to swipe his or her credit, debit, identification, or other type cards through the magnetic stripe reader/writer 220 and store the information contained in the magnetic stripe in the memory device 120 of the wallet consolidator 100, or alternatively, in the memory device of the smart card. The wallet consolidator 100 can also allow an individual to scan a bar code on a card using the bar code scanner 180 and store the bar code in the wallet consolidator 100, or alternatively in the memory device of the smart card. Furthermore, the individual can download the image of the cards or other cards which do not have a magnetic stripe and, with sufficient memory, store a digitized image in the memory device 120 of the wallet consolidator 100, or alternatively in the memory device of the smart card. Additionally, other types of information can be stored in either the memory device 120 of the wallet consolidator 100 or the memory device of the smart card. Among other types of information, items such as electronic coupons or food stamp balances can be stored and then redeemed during a point-of-sale transaction. Communication with various computing devices such as, but not limited to, point-of-sale terminals, dumb terminals, and databases, can be effectuated using the telephone interface 160, the radio frequency transceiver 210, the infrared transceiver 190, or the display screen 200.

Figure 2:
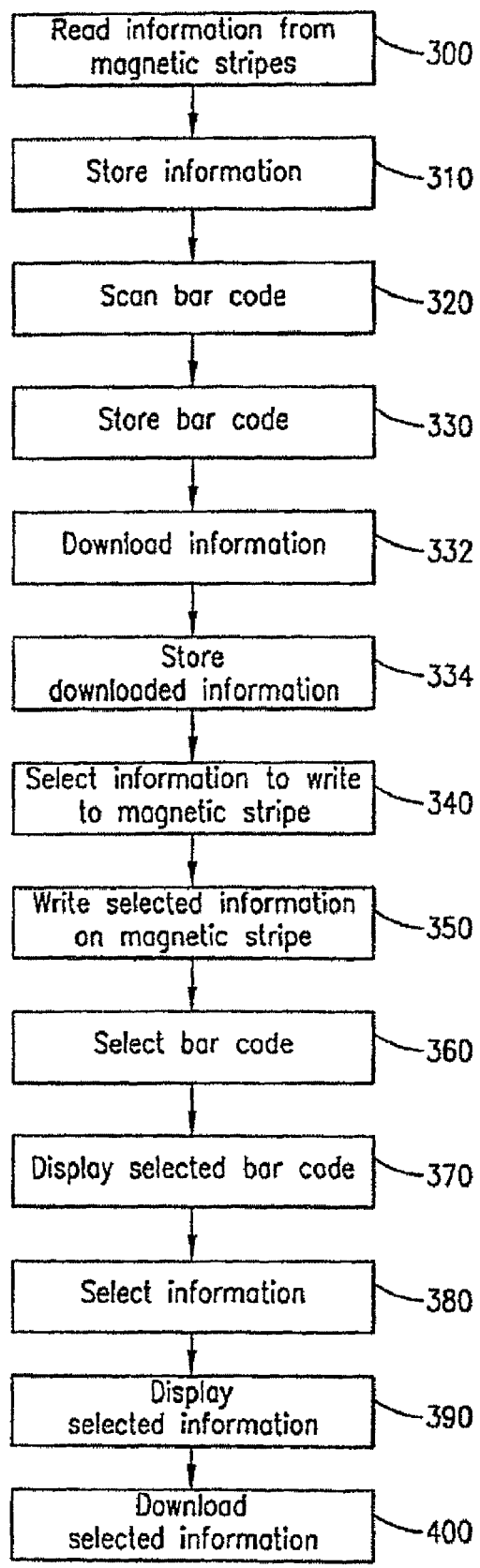
FIG. 2 is a flow diagram of a preferred method for consolidating card information using the wallet consolidator described in FIG. 1.

Referring additionally now to FIG. 2, there is illustrated a flow diagram of a preferred computer implemented method for consolidating card information using the wallet consolidator 100 described in FIG. 1. Information stored on magnetic stripes can be entered into the wallet consolidator 100 by swiping the subject identification, credit, debit, or other type of card through the magnetic stripe reader/writer 220 to read the information from the magnetic stripe of the subject card (step 300). Alternatively, the information can be entered into the wallet consolidator 100 via the data interface 140, the keypad 150, the telephone interface 160, the infrared transceiver 190, or the radio frequency transceiver 210. The entered information can be stored in the memory device 120 of the wallet consolidator 100, or alternatively, in the memory device of the smart card (step 310).

Similarly, bar codes from the cards can be scanned (step 320) and the bar codes can be stored in the memory device 120 of the wallet consolidator 100, or alternatively, in the memory device of the smart card (step 330). Alternatively, the information can be entered into the wallet consolidator 100 via the data interface 140, the keypad 150, the telephone interface 160, the infrared transceiver 190, or the radio frequency transceiver 210.

Still further, other information such as electronic coupons or images such as portraits and signatures can be downloaded into the wallet consolidator 100 (step 332) and stored in the memory device 120 of the wallet consolidator 100, or alternatively, in the memory device of the smart card (step 334). The information can be downloaded into the wallet consolidator 100 via the data interface 140, the keypad 150, the telephone interface 160, the infrared transceiver 190, or the radio frequency transceiver 210.

To retrieve magnetic stripe information from the wallet consolidator 100, the user can select the desired information using either the user input cluster 130 or the keypad 150 (step 340). Once the information has been selected, the information can be written onto a magnetic strip of the smart card or other multi-use card (step 350). Alternatively, the information which was selected can be communicated to various computing devices such as, but not limited to, point-of-sale terminals, dumb terminals, and databases via the data interface 140, the telephone interface 160, the infrared transceiver 190, or the radio frequency transceiver 210.

Similarly, the user can select a desired bar code using either the user input cluster 130 or the keypad 150 (step 360), and the selected image can be displayed on the display screen 200 (step 370). Alternatively, the selected information can be communicated to various computing devices such as, but not limited to, point-of-sale terminals, dumb terminals, and databases via the data interface 140, the telephone interface 160, the infrared transceiver 190, or the radio frequency transceiver 210.

Still further, the user can select stored information, including downloaded information (step 380), and display the selected information (step 390) or download the selected information (step 400) to various computing devices such as, but not limited to, point-of-sale terminals, dumb terminals, and databases via the data interface 140, the telephone interface 160, the infrared transceiver 190, or the radio frequency transceiver 210.

Figure 3:
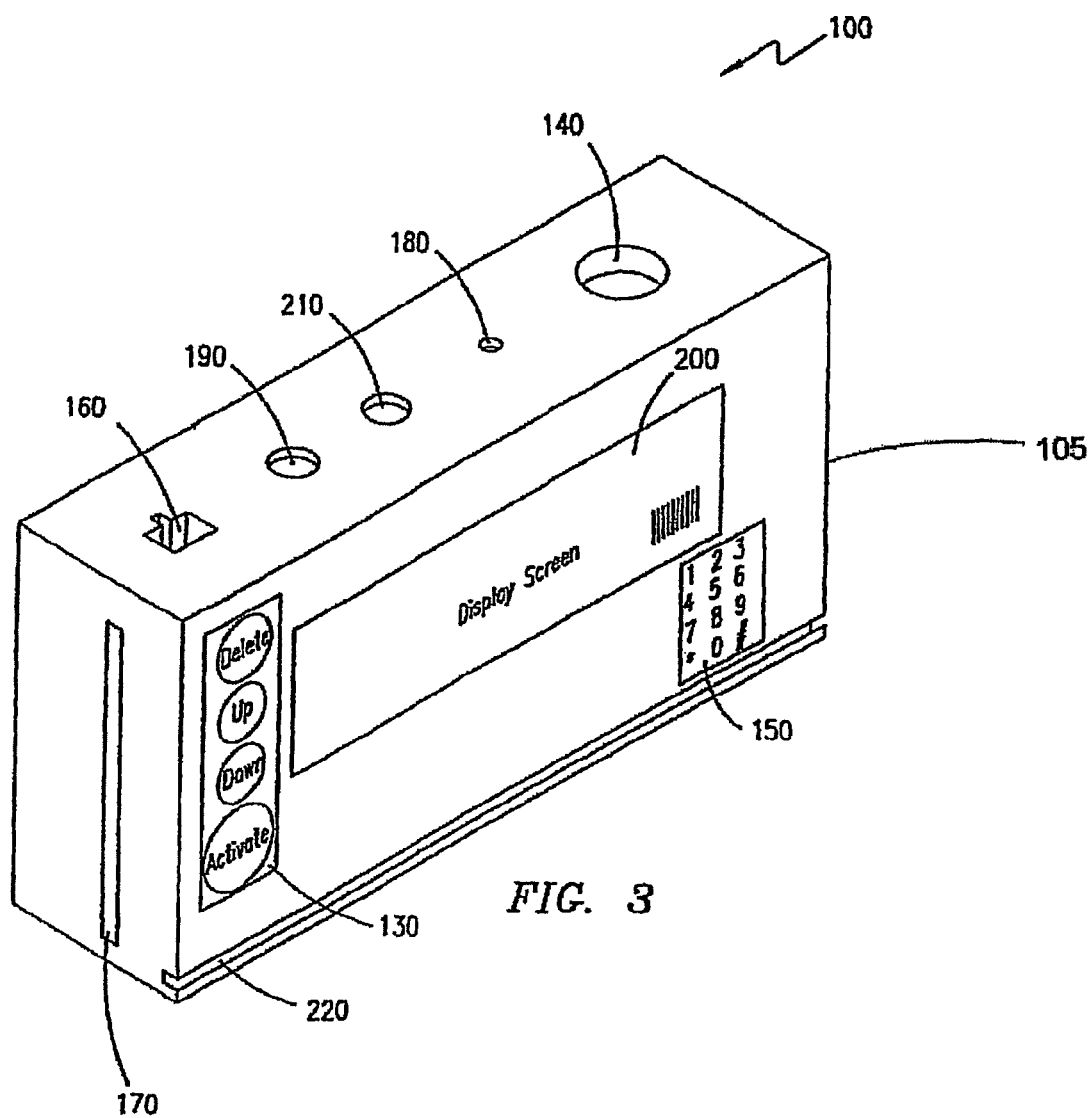
FIG. 3 is a perspective view of a wallet consolidator consistent with a preferred embodiment of the present invention.

Referring now to FIG. 3, there is illustrated a perspective view of a wallet consolidator 100. The wallet consolidator, shown generally at 100, can include a housing 105, the controller 110 which is located internally and not shown, the memory device 120 also located internally and not shown, the user input cluster 130, the data interface 140, the keypad 150, the telephone interface 160, the smart card interface 170, the bar code scanner 180, the infrared transceiver 190, the display screen 200, the radio frequency transceiver 210, and the magnetic stripe reader/writer 220.

This application is related to U.S. patent application Ser. No. 11/931,479, filed Oct. 31, 2007, titled "Wallet Consolidator and Related Methods of Processing a Transaction Using a Wallet Consolidator"; U.S. patent application Ser. No. 09/923,617, filed Aug. 6, 2001, titled "Wallet Consolidator and Related Methods of Processing a Transaction Using a Wallet Consolidator" now U.S. Pat. No. 7,349,885; U.S. patent application Ser. No. 09/618,407, filed Jul. 18, 2000, titled "Wallet Consolidator," now U.S. Pat. No. 6,293,462; and U.S. patent application Ser. No. 09/087,193, filed May 29, 1998, titled "Wallet Consolidator," now U.S. Pat. No. 6,131,811, each incorporated herein by reference in their entireties.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. A wallet consolidator to facilitate a transaction, the wallet consolidator comprising:
   a housing to be carried by a user;
   a data interface connected to the housing and being positioned to effectuate communication between the wallet consolidator and one or more computing devices to thereby receive information associated with at least one card from one or more computing devices so that at least a portion of the information received by the data interface enables a transaction, the at least one card being selected from the group of: credit cards, debit cards, identification cards, and electronic coupons;
   memory positioned in the housing and positioned to store at least a portion of the information received by the data interface;
   a user input cluster connected to the housing to facilitate selection of at least a portion of the information by a user;
   a display screen to display a menu of functions to a user, the functions including one or more of: adding card information, deleting card information, duplicating information, transferring information, moving cash, and accessing information; and
   a controller located internally inside the housing, in communication with each of the data interface, the memory, the user input cluster, and the display screen, and positioned to control input of the information into the memory of the wallet consolidator through the data interface, display of the menu of functions to a user through the display screen, retrieval of the at least a portion of the information from the memory, and display of at least a portion of the information stored in the memory on the display screen when a user selects the at least a portion of the information using the user input cluster and positions the display screen of the wallet consolidator to enable a transaction responsive to the at least a portion of the information stored in the memory being displayed on the display screen.

2. A wallet consolidator as defined in claim 1, wherein the information displayed on the display screen comprises information from the memory being displayed as controlled by the controller, the information selected from the group of: signatures, portraits, bar codes which can be scanned by a bar code scanner, and images of one or more cards.

3. A wallet consolidator as defined in claim 1, wherein the information received by the data interface includes information included on a plurality of different cards, the cards being selected from the group of: credit cards, debit cards, identification cards, and electronic coupons; and wherein the wallet consolidator further includes a radio frequency wireless communication interface.

4. A wallet consolidator as defined in claim 3, wherein the user input cluster operably receives an input of a passcode from a user to gain access to the wallet consolidator so that the controller displays the menu of functions after the user gains access to the wallet consolidator by entering the passcode through the user input cluster.

5. A wallet consolidator as defined in claim 1,
   wherein the memory at least has sufficient memory to store a digitized image, the digitized image being selected from the group of a signature, a portrait, the at least one card, and a bar code; and
   wherein the controller operably stores the digitized image in the memory of the wallet consolidator.

6. A wallet consolidator as defined in claim 5,
   wherein the controller operably displays the digitized image on the display screen to thereby define a displayed digitized image; and
   wherein the displayed digitized image is used usable at a point-of-sale terminal.

7. A wallet consolidator as defined in claim 1,
   wherein the memory at least has sufficient memory to store a digitized image of a bar code; and
   wherein the controller operably stores the digitized image of a bar code in the memory of the wallet consolidator and operably displays the digitized image of a bar code on the display screen to thereby define a displayed digitized image of a bar code, the displayed digitized image of a bar code being scannable by a bar code scanner.

8. A wallet consolidator as defined in claim 1,
   wherein the information stored in the memory includes at least one bar code; and
   wherein the controller operably displays the bar code on the display screen to thereby define a displayed bar code image, the displayed bar code image being scannable by a bar code scanner.

9. A wallet consolidator as defined in claim 1, wherein the wallet consolidator includes a touch sensitive display screen associated with the display screen, associated with the housing, and positioned adjacent to the user input cluster.

10. A wallet consolidator as defined in claim 1, wherein the information received by the data interface includes identification information selected from the group of information associated with one or more of: driver's licenses, food stamps, credit cards, debit cards, identification cards, electronic coupons, health club cards, parking cards, entry cards, and medical records.

11. A wallet consolidator to facilitate a transaction, the wallet consolidator comprising:
- a housing to be carried by a user;
- a radio frequency transceiver connected to the housing and being positioned to effectuate communication between the wallet consolidator and one or more computing devices to thereby receive information associated with at least one card from one or more computing devices so that at least a portion of the information received by the radio frequency transceiver enables a transaction, the at least one card being selected from the group of: credit cards, debit cards, identification cards, and electronic coupons;
- memory positioned in the housing and positioned to store at least a portion of the information received by the radio frequency transceiver;
- a user input cluster connected to the housing to facilitate selection of at least a portion of the information by a user;
- a display screen to display a menu of functions to a user, the functions including one or more of: adding card information, deleting card information, duplicating information, transferring information, moving cash, and accessing information; and
- a controller located internally inside the housing, in communication with each of the radio frequency transceiver, the memory, the user input cluster, and the display screen, and positioned to control input of the information into the memory of the wallet consolidator through the radio frequency transceiver, display of the menu of functions to a user through the display screen, retrieval of the at least a portion of the information from the memory, and display of at least a portion of the information stored in the memory on the display screen when a user selects the at least a portion of the information using the user input cluster and positions the display screen of the wallet consolidator to enable a transaction responsive to the at least a portion of the information stored in the memory being displayed on the display screen.

12. A wallet consolidator as defined in claim 11, wherein the information displayed on the display screen comprises information from the memory being displayed as controlled by the controller, the information selected from the group of: signatures, portraits, bar codes which can be scanned by a bar code scanner, and images of one or more cards.

13. A wallet consolidator as defined in claim 11,
- wherein the information received by the radio frequency transceiver includes information included on a plurality of different cards, the cards being selected from the group of: selected from the group of: credit cards, debit cards, identification cards, and electronic coupons; and
- wherein the wallet consolidator further includes a radio frequency wireless communication interface.

14. A wallet consolidator as defined in claim 13, wherein the user input cluster operably receives an input of a passcode from a user to gain access to the wallet consolidator so that the controller displays the menu of functions after the user gains access to the wallet consolidator by entering the passcode through the user input cluster.

15. A wallet consolidator as defined in claim 11,
- wherein the memory at least has sufficient memory to store a digitized image, the digitized image being selected from the group of a signature, a portrait, the at least one card, and a bar code; and
- wherein the controller operably stores the digitized image in the memory of the wallet consolidator.

16. A wallet consolidator as defined in claim 15,
- wherein the controller operably displays the digitized image on the display screen to thereby define a displayed digitized image; and
- wherein the displayed digitized image is usable at a point-of-sale terminal.

17. A wallet consolidator as defined in claim 11,
- wherein the memory at least has sufficient memory to store a digitized image of a bar code; and
- wherein the controller operably stores the digitized image of a bar code in the memory of the wallet consolidator and operably displays the digitized image of a bar code on the display screen to thereby define a displayed digitized image of a bar code, the displayed digitized image of a bar code being scannable by a bar code scanner.

18. A wallet consolidator as defined in claim 11,
- wherein the information stored in the memory includes at least one bar code; and
- wherein the controller operably displays the bar code on the display screen to thereby define a displayed bar code image, the displayed bar code image being scannable by a bar code scanner.

19. A wallet consolidator as defined in claim 11, wherein the wallet consolidator includes a touch sensitive display screen associated with the display screen, associated with the housing, and positioned adjacent to the user input cluster.

20. A wallet consolidator as defined in claim 11, wherein the information received by the radio frequency transceiver includes identification information selected from the group of information associated with one or more of: driver's licenses, food stamps, credit cards, debit cards, identification cards, electronic coupons, health club cards, parking cards, entry cards, and medical records.

* * * * *

UNITED STATES PATENT AND TRADEMARK OFFICE
CERTIFICATE OF CORRECTION

PATENT NO.        : 7,712,658 B2                                                             Page 1 of 1
APPLICATION NO.   : 11/932049
DATED             : May 11, 2010
INVENTOR(S)       : Frank Gangi It is certified that error appears in the above-identified patent and that said Letters Patent is hereby corrected as shown below:

Column 2 Line 63-64, delete the second set of words "can include" that are between "include" and "information".

Signed and Sealed this

Thirty-first Day of August, 2010

David J. Kappos
*Director of the United States Patent and Trademark Office*